(12) United States Patent
Das et al.

(10) Patent No.: US 11,138,615 B1
(45) Date of Patent: Oct. 5, 2021

(54) LOCATION-BASED PLACE ATTRIBUTE PREDICTION

(71) Applicant: Google Inc., Mountain View, CA (US)

(72) Inventors: Abhimanyu Das, San Jose, CA (US); Evgeniy Gabrilovich, Saratoga, CA (US); Wei Lwun Lu, Mountain View, CA (US); Shuxin Nie, San Jose, CA (US)

(73) Assignee: Google LLC, Mountain View, CA (US)

( * ) Notice: Subject to any disclaimer, the term of this patent is extended or adjusted under 35 U.S.C. 154(b) by 882 days.

(21) Appl. No.: 15/234,132

(22) Filed: Aug. 11, 2016

(51) Int. Cl.
*G06Q 30/02* (2012.01)
*G06N 20/00* (2019.01)
*G06F 16/29* (2019.01)

(52) U.S. Cl.
CPC ......... *G06Q 30/0202* (2013.01); *G06F 16/29* (2019.01); *G06N 20/00* (2019.01); *G06Q 30/0205* (2013.01)

(58) Field of Classification Search
CPC ...................................... G06Q 30/00–30/0284
USPC ............................................. 705/14.1–14.73
See application file for complete search history.

(56) References Cited

U.S. PATENT DOCUMENTS

| | | | | |
|---|---|---|---|---|
| 2014/0136443 | A1* | 5/2014 | Kinsey, II | G06Q 30/0631 705/347 |
| 2016/0165403 | A1* | 6/2016 | Turner | H04L 51/20 455/456.3 |

OTHER PUBLICATIONS

Zheng et al., Mining Correlation Between Locations Using Human Location History, 2009, GIS conference pp. 1-5 (Year: 2009).*
Liblinear—A Library for Large Linear Classification, <http://www.csie.ntu.edu.tw/~cjlin/liblinear/> (2015).
Cheng, C., et al., "Where You Like to Go Next: Successive Point-of-Interest Recommendation". In IJCAI (2013). 7 pgs.
Cheng, H., et al., "What's Your Next Move: User Activity Prediction in Location-Based Social Networks". In SIAM (2013). 9 pgs.
Eland, A., Tackling Urban Mobility With Technology, <http://googlepolicyeurope.blogspot.com/2015/11/tackling-urban-mobility-with-technology.html> Google Europe Blog, 2015. Visited on Jan. 29, 2016. 5 pgs.
Hu, M., and Liu, B., "Mining and Summarizing Customer Reviews" In KDD (2004). 10 pgs.
Hu, M., and Liu, B., "Mining Opinion Features in Customer Reviews" In AAAI (2004). 6 pgs.

(Continued)

*Primary Examiner* — John Van Bramer
(74) *Attorney, Agent, or Firm* — Lerner, David, Littenberg, Krumholz & Mentlik, LLP

(57) ABSTRACT

Location history data can be used to identify attributes for a known geographic location of a business listing record for a business. As an example, location history data is received from each of a plurality of client computing devices. For each device, the location history data identifies an arrival and departure times for the known geographic location as well as prior and next visit information. The location history data is used as input into a classifier in order to identify a set of attributes for the geographic location and corresponding likelihood values for each of the attributes of the set of attributes. A subset of the set of attributes is determined such that the attributes describe aspects of the known geographic location based on the likelihood values. This subset is provided to a client computing device in response to a request for information about the geographic location.

15 Claims, 7 Drawing Sheets

(56) References Cited

OTHER PUBLICATIONS

Jakob, N., and Gurevych, I., "Extracting Opinion Targets in a Single-and Cross-Domain Setting With Conditional Random_Elds". In EMNLP (2010). 11 pgs.
Kirmse, A., et al., "Extracting Patterns From Location History". In GIS (2011). 4 pgs.
Koren, Y., et al., "Matrix Factorization Techniques for Recommender Systems". IEEE Computer 42, 8 (Aug. 2009). 8 pgs.
Ku, L.-W., et al., "Opinion Extraction, Summarization and Tracking in News and Blog Corpora". In AAAI Spring Symp.: Computational Approaches to Analyzing Weblogs (2006). 8 pgs.
Li, M., et al., "Inferring Movement Trajectories From GPS Snippets". In WSDM (2015). 10 pgs.
Lian, D., et al., "GeoMF: Joint Geographical Modeling and Matrix Factorization for Point-of-Interest Recommendation". In KDD (2014). 10 pgs.
Liao, L., et al., "Location-Based Activity Recognition". In NIPS (2005). 8 pgs.
Lichman, M., and Smyth, P., "Modeling Human Location Data With Mixtures of Kernel Densities". In KDD (2014). 10 pgs.
Liu, B., "Sentiment Analysis and Opinion Mining, vol. 5 of Synthesis Lectures on Human Language Technologies". Morgan & Claypool Publishers (2012). 182 pgs.
Long, C., et al., "A Review Selection Approach for Accurate Feature Rating Estimation". In COLING (2010). 9 pgs.
Qiu, G., et al., "Opinion Word Expansion and Target Extraction Through Double Propagation". Comput. Linguist. 37, 1 (Mar. 2011). 20 pgs.
Wang, H., et al., "Latent Aspect Rating Analysis on Review Text Data: A Rating Regression Approach". In KDD (2010). 10 pgs.
Ye, M., et al., "Exploiting Geographical Inuence for Collaborative Point-of-Interest Recommendation". In SIGIR (2011). 10 pgs.
Zheng, V. W., et al., "Collaborative Location and Activity Recommendations With Gps History Data". In WWW (2010). 10 pgs.
Zheng, Y., et al., "Mining Correlation Between Locations Using Human Location History". In GIS (2009). 5 pgs.
Zhong, Y., et al., "You Are Where You Go: Inferring Demographic Attributes From Location Check-Ins". In WSDM (2015). 10 pgs.
Zhuang, L., et al., "Movie Review Mining and Summarization". In CIKM (2006). 8 pgs.

* cited by examiner

| | Arrival Time | Departure Time | Duration Time (minutes) | Day of the Week Visited | Category of Prior Location(s) visited 12 hours before the subject location | Category of Next Location(s) Visited in the next 12 hours after the subject location |
|---|---|---|---|---|---|---|
| U1 | 7:20 am | 7:32 am | 12 | Mon | Hotel | Retail |
| U2 | 8:42 am | 9:02 am | 19 | Wednesday | Financial | Museum |
| U3 | 8:05 am | 8:15 am | 10 | Monday | Hotel | Restaurant |
| U4 | 8:32 am | 8:50 am | 18 | Friday | none | Retail |
| ... | ... | ... | ... | ... | ... | ... |
| U1850 | 11:32 am | 12:00 am | 8 | Friday | Gas station | Retail |

FIGURE 4

| Attribute | Attrib type | Description |
|---|---|---|
| Wine | Notable | Good for wine |
| Takeout | Meal type | Food takeout available |
| Brunch | Meal type | Serves brunch |
| Happy hour | Meal type | Has happy hour |
| Upscale | Formality | Formal attire |
| Hip | Crowd | Attracts hip crowd |
| WiFi | Features | WiFi available |
| Romantic | Atmosphere | Romantic atmosphere |
| Outdoor seating | Features | Has outdoor seating |
| Breakfast | Meal type | Serves breakfast |
| Lunch | Meal type | Serves lunch |
| Dinner | Meal type | Serves dinner |
| Food | Intent | Mainly visited for food (as opposed to drinks) |
| Drink | Intent | Main visit: drinks |
| Low price | Price | Inexpensive |
| Cozy | Atmosphere | Cozy atmosphere |
| Lively | Atmosphere | Lively atmosphere |
| Quiet | Atmosphere | Quiet atmosphere |
| Groups | Company | Good for groups |
| No reservations | Ease of entry | Reserv. not required |
| Usually a wait | Ease of entry | Longer wait time |
| Live music | Entertainment | Has live music |
| Fast food | Restaur. type | Serves fast food |
| Delivery | Features | Delivers food |
| Casual | Formality | Casual attire |
| Dessert | Notable | Good for desserts |
| Tea | Notable | Good for tea |
| Healthy | Food type | Serves healthy food |
| Vegetarian | Food type | Good veg. selection |

FIGURE 5

| Attribute | Description |
| --- | --- |
| Air conditioned | Air conditioning available |
| All inclusive | All inclusive available |
| Affiliated golf course | Access to golf course |
| Airport shuttle | Hotel offers airport shuttle |
| Bar or lounge | Hotel has bar or lounge |
| Beach access | Hotel has beach access |
| Business center | Hotel has business center |
| Fitness center | Hotel has fitness center |
| Free breakfast | Hotel has free breakfast |
| Hot tub | Hotel has hot tub |
| Laundry service | Hotel offers laundry service |
| Restaurant | Hotel has restaurant |
| Room service | Hotel offers room service |
| Spa | Hotel offers spa services |
| Pets allowed | Hotel allows pets |
| Smoke free | Smoke free property |

LOCATION-BASED PLACE ATTRIBUTE PREDICTION

BACKGROUND

Information regarding specific establishments, such as businesses, retail centers, and the like are generated using actual feedback from patrons of a business or location. For instance, patrons can provide an online review about an establishment either directly on a review site or indirectly through social media. Prior art relies upon determining attributes of an establishment based upon a text analysis of online reviews. However, many patrons have no desire to leave feedback, which makes it difficult to properly predict the attributes of a location and can lead to inaccurate or biased classification of the location. Improvements are therefore needed.

SUMMARY

Aspects of the disclosure provide a method of identifying attributes for a known geographic location for a business. The method includes receiving, by one or more computing devices, from each of a plurality of client computing devices each associated with a respective user, location history data. For each given respective user, the location history data identifies a first geographic location corresponding to a business visited by the respective user prior to an arrival time for the given respective user arriving at the known geographic location, the arrival time, a departure time for the given respective user leaving the geographic location, and a second geographic location corresponding to a business visited by the respective user after the departure time. The method also includes using, by the one or more computing devices, the location history data from each of the plurality of client computing devices as input into a classifier in order to identify a set of attributes for the geographic location and corresponding likelihood values for each of the attributes of the set of attributes; determining, by the one or more computing devices, to the business listing for the business, a subset of the set of attributes for the geographic location such that the attributes describe aspects of the known geographic location based on the likelihood values; and providing, by the one or more computing devices, the subset of attributes to a client computing device in response to receiving a request for information about the geographic location.

In one example, the method also includes training the classifier using pre-assigned attribute labels and machine learning. In another example, the assigning occurs in response to receiving the request for information. In another example, the location data further includes duration data which provides a duration of time that a user spent at the known geographic location and the method further comprises using the duration data to identify the likelihood values for the set of attributes. In another example, determining the subset of attribute is further based on whether the likelihood values meet a threshold value. In another example, identifying the set of attributes is based on co-visit data defining user visiting patterns for a pair of users that visit one or more known business locations together. In another example, the method also includes accessing a set of business listing records to identify the first geographic location and the second geographic location, wherein each of the first geographic location, the second geographic location, and the known geographic location corresponds to a respective business listing record of the business listing records; and updating the respective business listing record of the known geographic location to include the subset of attributes. In this example, identifying the set of attributes is further based on categories for the first geographic location, the second geographic location, and the known geographic location defined in the respective business listing records the first geographic location, the second geographic location, and the known geographic locations. In another example, the method also includes accessing a set of pre-defined attributes for a category of business corresponding to the category of the business defined in a business listing record for the business, such that the set of attributes includes the set of pre-defined attributes and updating the business listing record to include the subset of attributes.

Another aspect of the disclosure provides a system for identifying attributes for a known geographic location for a business. The system includes one or more processors configured to receive from each of a plurality of client computing devices each associated with a respective user, location history data, wherein for each given respective user, the location history data identifies a first geographic location corresponding to a business visited by the respective user prior to an arrival time for the given respective user arriving at the known geographic location, the arrival time, a departure time for the given respective user leaving the geographic location, and a second geographic location corresponding to a business visited by the respective user after the departure time; use the location history data from each of the plurality of client computing devices as input into a classifier in order to identify a set of attributes for the geographic location and corresponding likelihood values for each of the attributes of the set of attributes; determine a subset of the set of attributes for the geographic location such that the attributes describe aspects of the known geographic location based on the likelihood values; and provide the subset of attributes to a client computing device in response to receiving a request for information about the geographic location.

In one example, the one or more processors are further configured to train the classifier using pre-assigned attribute labels and machine learning. In another example, the the one or more processors are further configured to determine the subset of attributes in response to receiving the request for information. In another example, the location data further includes duration data which provides a duration of time that a user spent at the known geographic location and the one or more processors are further configured to use the duration data to identify the likelihood values for the set of attributes. In another example, the one or more processors are further configured to determine the subset of attribute further based on whether the likelihood values meet a threshold value. In another example, the one or more processors are further configured to identify the set of attributes based on co-visit data defining user visiting patterns for a pair of users that visit one or more known business locations together. In another example, the one or more processors are further configured to access a set of business listing records to identify the first geographic location and the second geographic location, wherein each of the first geographic location, the second geographic location, and the known geographic location corresponds to a respective business listing record of the business listing records; and update the respective business listing record of the known geographic location to include the subset of attributes. In this example, the one or more processors are further configured to identify the set of attributes further based on categories for the first geographic location, the second geographic location, and the known geographic location defined in the respective business listing records the first geographic location, the second geographic location, and the known geographic locations.

A further aspect of the disclosure provides a non-transitory computer-readable medium storing instructions, the instructions when executed by one or more processors, cause the one or more processors to perform a method for identifying attributes for a known geographic location for a business. The method includes receiving from each of a plurality of client computing devices each associated with a respective user, location history data, wherein for each given respective user, the location history data identifies a first geographic location corresponding to a business visited by the respective user prior to an arrival time for the given respective user arriving at the known geographic location, the arrival time, a departure time for the given respective user leaving the geographic location, and a second geographic location corresponding to a business visited by the respective user after the departure time; using the location history data from each of the plurality of client computing devices as input into a classifier in order to identify a set of attributes for the geographic location and corresponding likelihood values for each of the attributes of the set of attributes; determining a subset of the set of attributes for the geographic location such that the attributes describe aspects of the known geographic location based on the likelihood values; and providing the subset of attributes to a client computing device in response to a request for information about the geographic location.

In one example, the method also includes training the classifier using pre-assigned attribute labels and machine learning. In another example, the assigning occurs in response to receiving the request for information. In another example, the location data further includes duration data which provides a duration of time that a user spent at the known geographic location and the method further comprises using the duration data to identify the likelihood values for the set of attributes. In another example, determining the subset of attribute is further based on whether the likelihood values meet a threshold value. In another example, identifying the set of attributes is based on co-visit data defining user visiting patterns for a pair of users that visit one or more known business locations together. In another example, the method also includes accessing a set of business listing records to identify the first geographic location and the second geographic location, wherein each of the first geographic location, the second geographic location, and the known geographic location corresponds to a respective business listing record of the business listing records; and updating the respective business listing record of the known geographic location to include the subset of attributes. In this example, identifying the set of attributes is further based on categories for the first geographic location, the second geographic location, and the known geographic location defined in the respective business listing records the first geographic location, the second geographic location, and the known geographic locations. In another example, the method also includes accessing a set of pre-defined attributes for a category of business corresponding to the category of the business defined in a business listing record for the business, such that the set of attributes includes the set of pre-defined attributes and updating the business listing record to include the subset of attributes.

BRIEF DESCRIPTION OF THE DRAWINGS

FIG. 4 is an example of location history data for a geographic location.

FIG. 5 is an example of labels identifying attributes of a restaurant at geographic location according to aspects of the disclosure.

FIG. 6 is an example of labels identifying attributes of a hotel at a geographic location according to aspects of the disclosure.

DETAILED DESCRIPTION

Overview

Figure 1:
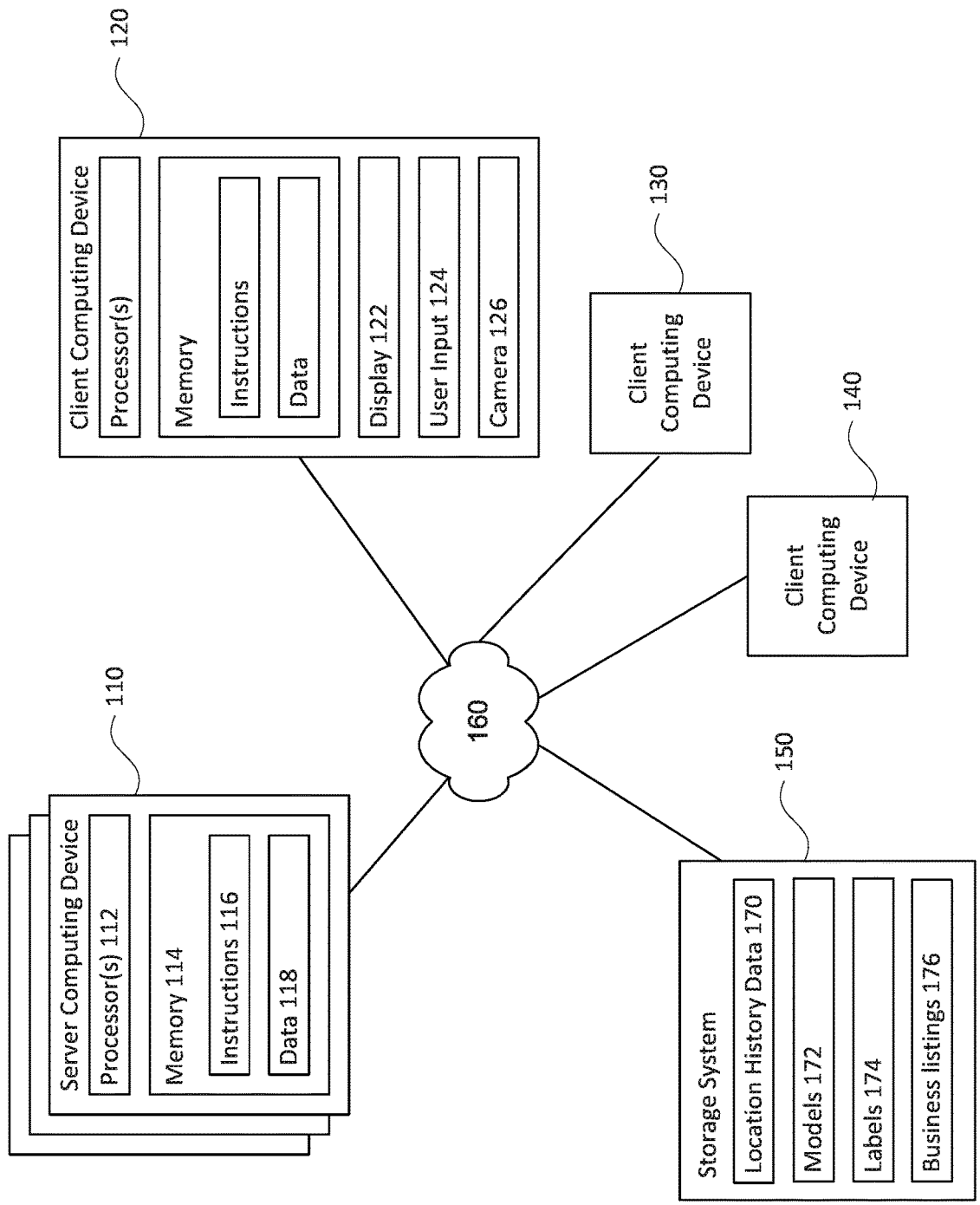
FIG. 1 is a functional diagram of an example system in accordance with aspects of the disclosure.

Aspects of the disclosure are directed to automatically identifying aspects or attributes of a known business location using location history data for a plurality of users. For instance, the location history data of a user both before and after a particular known business location has been visited can be used to identify aspects or attributes of a particular known business location, such as whether a known business location is child friendly, a dinner location, a coffee ship, etc.

Based on location history data, user visiting patterns can be determined for a specific known business location. For example, location history data for a plurality of users over a given period of time may be used to identify user visiting patterns that describe when the majority of the plurality of users arrive at the specific known business location, when those users leave the specific known business location, and a typical or average duration of a stay at the known business location. These patterns may also include other known business locations as well as the categories of these other known business locations where a plurality of users go prior to arriving at the specific known business location as well as afterwards.

A model can be constructed using supervised learning to predict aspects of a particular known business location based upon location history data. To generate the model, location history data and user visiting patterns may be analyzed by operators in order to identify attributes for the specific known business location. The operator may then assign labels for attributes to the specific known business location.

The labels commonly assigned to the known business location can include at least the attribute, as well as the attribute type, and a corresponding description that accompanies the attribute. The description can assist the operator in assigning a particular attribute.

The operator-assigned labels, location history data, and specific known business locations are then used as input into a classifier. These inputs are used to train the classifier and create a model that identifies a confidence in or likelihood of a given known business location having any of the attributes of the operator-assigned labels using user location history data that includes the given known business location.

Once the classifier has been trained, the classifier can use new or other user location history data including a particular known business location to identify likelihood values for a particular known business location having any of the aspects of the operator-assigned labels. The result is a list of aspects and associated likelihood values. As an example, these likelihood values may be arranged on a predetermined scale, such as from 0 to 1, 0 being not likely at all and 1 being very likely.

Identified attributes for a given known business location having a high enough likelihood value may be assigned to the given known business location. For instance, attributes for the given known business location that have likelihood values greater than a threshold value may be assigned to the given known business location. This, in turn, may be provided to users who request information about the given known business location. As new user known business location data is received, it may be automatically input into the classifier to identify additional or new attributes for a given known business location. Alternatively, the location history data including a given known business location may be used as input into a classifier upon receiving a user request for more information about the given known business location.

In addition to analyzing location history data to determine likelihood values, the classifier can be trained to assign likelihood values for the attributes of the labels using the interactions between the various attributes, which can further improve the accuracy of the attributes.

Identifying attributes through user location history data provides a reliable way to determine the aspects of a particular known business location. User location history of multiple users allows for information to be obtained in the aggregate, at the population level, instead of per-user. This can dramatically increase the ability to gather useful information about a known business location and determine place aspects, without relying upon individual users to provide feedback or relying on partial user-provided feedback.

Example Systems

Figure 2:
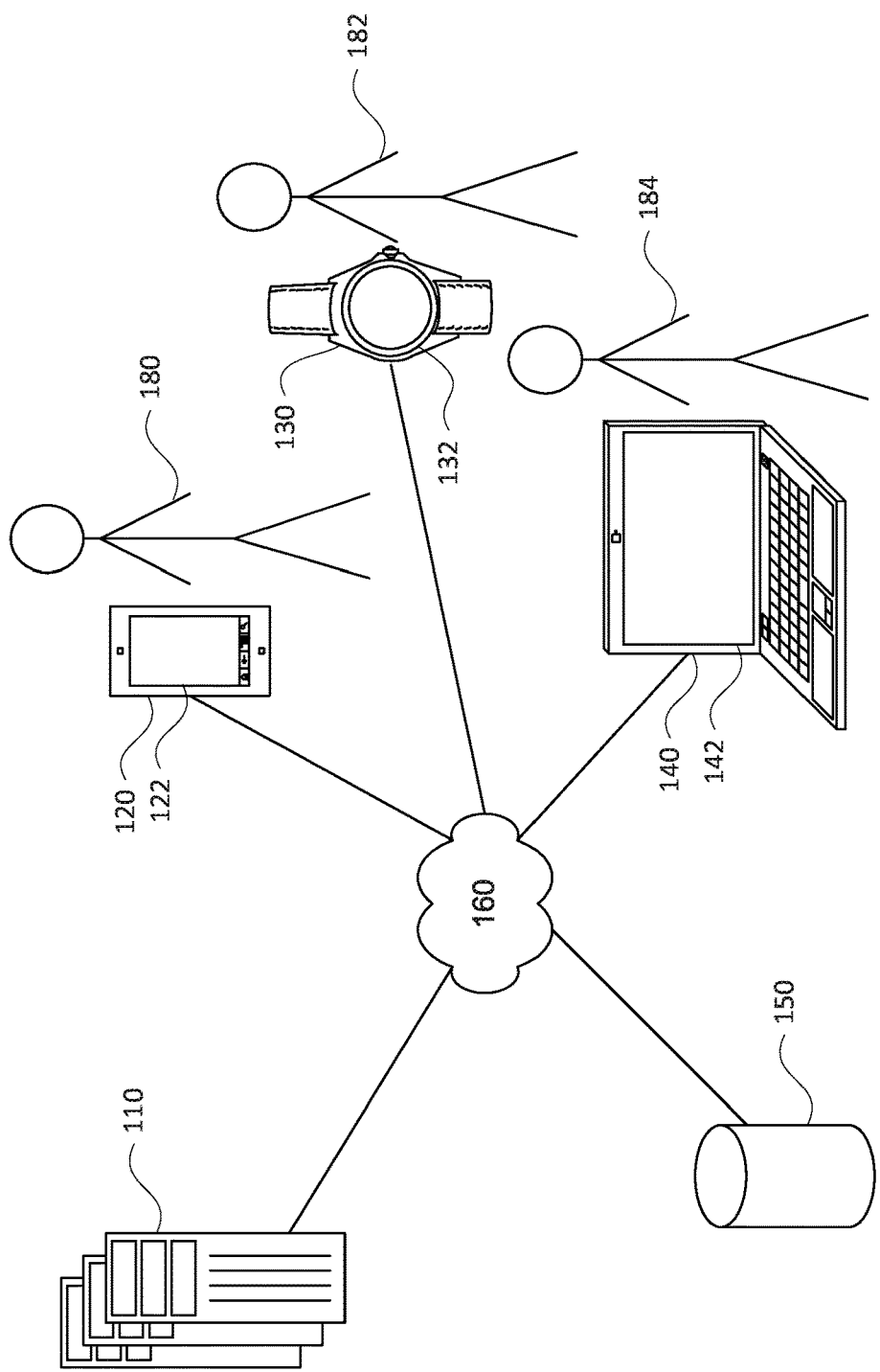
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Each computing device 110 can contain one or more processors 112, memory 114 and other components typically present in general purpose computing devices. Memory 114 of each of computing devices 110, 120, 130, and 140 can store information accessible by the one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 118 may be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices 110 can be at different nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 180, 182, and 184 on a display, such as displays 122, 132, or 142 of computing devices 120, 130, or 140. In this regard, computing devices 120, 130, and 140 may be considered client computing devices and may perform all or some of the features described herein.

Each of the client computing devices 120, 130, and 140 may be configured similarly to the server computing devices 110, with one or more processors, memory and instructions as described above. Each client computing device 120, 130, or 140 may be a personal computing device intended for use by a user 180, 182, and 184, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touchscreen, or microphone). The client computing device may also include a camera for recording video streams and/or capturing images, speakers, a network interface device, and all of the components used for connecting these elements to one another.

Although the client computing devices 120, 130, and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a watch. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown).

The storage system 150 may store a database of business listing records 176. A business listing record may be store or represent a business listing. A business listing record may store information about a business or business entity, such as the business' title, the business' phone number, the description about the business, a business location such as the business' postal address or other physical location, the URL for the business' website, a category or type of the business (i.e., restaurant, grocery store, hotel), or other such business information. In addition, at least some of the business listing records may include assigned attributes. As indicated below, the business locations defined in the business listing records 176 may be used to identify user visiting patterns and identify the assigned attributes for the businesses in the business listing records.

Storage system 150 may store user location data 170. The location history data 170 can be provided by a user's client computing device, such as one or more of client computing devices 120, 130, 140. For instance, raw location data (i.e. GPS coordinates) corresponding to locations visited by a user can be collected by the location determining programming (for instance, using a GPS receiver, WiFi, BLUETOOTH, cellular tower triangulation techniques, etc. to determine an approximate or actual geolocation of the client computing device) of the user's client computing device and thereafter be provided to the server computing devices 110 for storage in storage system 150 as location history data. The server can then convert these locations to business locations by "snapping" or assigning the raw location data to nearby (i.e. within some predetermined distance) business locations of the business listing records 176. The snapping may use various signals to assign the raw location data, including for instance the proximity of the raw location data to the business location of a business listing record, the duration of time during which the client computing device (or user) was proximate to the business location, etc.

The storage system 150 may also store a model 172 configured to be used by a classifier to classify locations. The model can be constructed using supervised learning to predict aspects of a particular location based upon location history data. To generate the model 172, location history data may be analyzed by operators in order to identify attributes for the specific location. The operator may then assign labels for attributes to the specific location as discussed in further detail below. These assigned labels along with the corresponding location history data may be used to train the model 271 such that the model can be used to label new or other location history data.

The storage system 150 may also store pre-defined labels 174 which identify attributes for businesses. The labels can include at least an attribute (i.e. the label itself), as well as the attribute type, and a corresponding description that accompanies the attribute. The description can assist an operator in assigning a particular attribute and identifying how an attribute describes a particular category of business. Labels used to identify attributes of a "restaurant" type business can include, for example, labels identifying attributes of the restaurant that affect a user's decision to dine at the restaurant. A non-exhaustive example of labels indicating attributes for restaurants is respectively set forth in FIG. 5. For example, restaurant labels may include wine, takeout, brunch, breakfast, lunch and dinner.

Labels used to identify attributes of a "hotel" type business can include, for example, labels identifying attributes of the restaurant that affect a user's decision to book a stay at the hotel. A non-exhaustive example of labels indicating attributes for restaurants is respectively set forth in FIG. 6. For example, hotel labels may include air conditioned, spa, beach access, and business center.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As a user moves around carrying his or her client computing devices, location history data may be collected. For instance, the GPS of the user's client computing device may provide GPS information (such as raw GPS signals or GPS coordinates) which the client device then provides to the server computing devices 110 as discussed above. In this regard, the server computing devices 110 may receive location history data from a plurality of users over time. Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user. Thus, the user may have control over what information is collected about the user, how that information is used, and what information is provided to the user.

Figure 3:
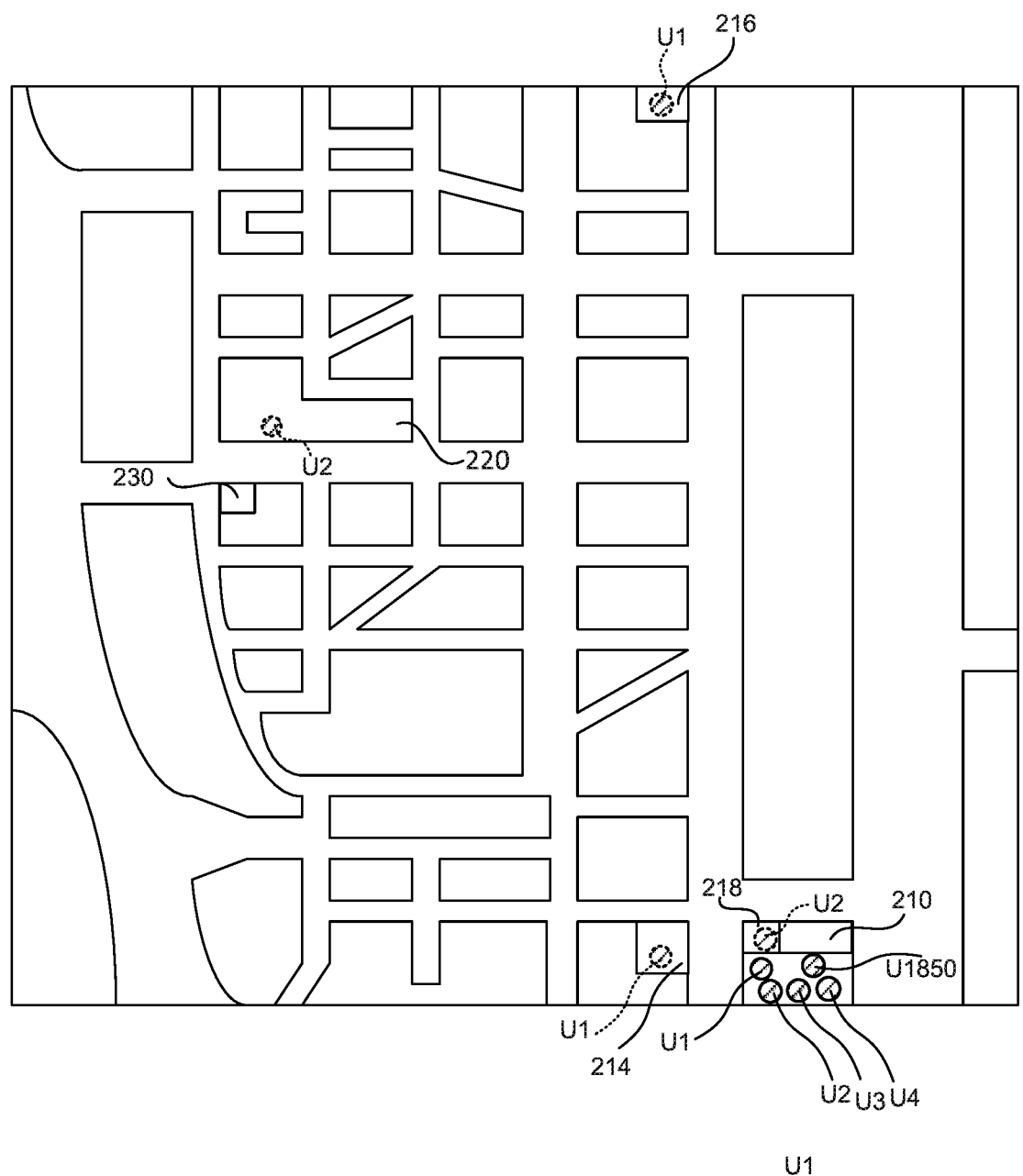
FIG. 3 is an example map showing geographic locations and users visiting the geographic locations at different points in time.

For instance, FIG. 3 illustrates a map 200 that illustrates a geographic location 210. Location history data may be collected for an entire population of users identified as being at the geographic location 210 of Fast Break Breakfast.

The location history data can then be analyzed to identify location history data for a known business location of the business listing records 176. In this regard, a business listing is "known" because it is including in in one of the business listing records 176 of storage system 150. For instance, the GPS information may be correlated to a known business location of the business listing records. Several signals may be used to perform this job, such as, proximity of the raw GPS signals or GPS coordinates to a business location and duration of the user wandering around the business's location. As an example, to determine that a user visited at a particular business location, a minimum amount of time, such as a few minutes or more or less) that the GPS information is at or near, such as within a few meters or more or less, the business location may be required.

The geographic location 210 may be compared to the business listing records 176 of storage system 150 and correlated to a known business location of a business listing record such as, for example, a business named Fast Break Breakfast, which has a known business location at the geographic location 210. For instance, if 1,850 users visited the geographic location 210 Fast Break Breakfast over the last 2 months, data regarding user visiting patterns at Fast Break Breakfast for those 1,850 users can be ascertained during this time period, or any other desired time period.

Location history data for a given user can therefore be analyzed to identify include arrival hour data, departure data, duration data, previous location data, and next location data for a known business location. For instance, after or prior to storage in the storage system 150, the location history data can be analyzed to identify various types of information for individual users which visit a known business location such as arrival hour data which provides a time at which a user arrived at the known business location, departure data which provides a time at which a user departed from the specific location, duration data which provides a duration of time which a user (or his or her client computing device) spent at the known business location, previous location data which identifies another known business location (of the business listing records 176) that the user visited prior to (or immediately prior to) arriving at the known business location, and next location data which identifies another known business location (of the business listing records 176) that the user visited after to departing from the known business location.

FIG. 4 illustrates a sampling of data collected in table format that establishes user visiting patterns at the geographic location 210 of Fast Break Breakfast. In this example, user visiting patterns were established for all users who patronized Fast Break Breakfast over a three month period, but in other examples, a subset of users and/or a different time period may be selected. For example, user U1 arrived at the geographic location 210 at 8:00 am; user U2 arrived at 9:45 am; user U3 arrived at 10:00 am; user U4 arrived at 8:32 am; and user U1850 arrived at 11:32 a.m.

The aforementioned various types of information can then be analyzed across a plurality of users for a known business location to identify user visiting patterns. For instance, arrival time data can be used to capture the distribution of user arrival time at a known business location. Similarly, the departure time data may be used capture the distribution of user departure times from a known business location. This can be provided in various forms such as to the hour of the week that users arrive at or departs from a known business location. The duration data may be used to capture the distribution of time users stay present at a known location. In this regard, the arrival time data, departure time data, and the duration data may be used to determine occupancy data for the known business location determined based upon the fraction of people who visit the place at different hours of the week. As an example the occupancy data can define the occupancy by hour of each day of the week.

Returning to FIG. 4, the collected data may further indicate the user patterns of additional patrons (not shown), which may show that the majority of users going to that location according to a user visiting pattern were users who arrive between the hours of 7:30-12:30 a.m. and no users arrive after 12:30 p.m. Similarly, user visiting patterns may show that most users at the location do not stay at the geographic location 210 longer than 30 minutes.

The previous location data for a plurality of users who visited a known business location can be analyzed to determine the types of business locations users visited before visiting the known business location. For instance, the distribution of user visits to other places can be determined within set time windows, such as 1, 4, 8, 16 and 24 hours. This distribution can be computed over categories of the business listing records (of business listing records 176) for each of the previously visited known business locations, such as restaurant, grocery store, hotel, as opposed to a specific known business location that is visited The resulting data may reflect the fraction of people visiting that place category in a given time window before the subject location.

The next visit data for a known business location can be analyzed to determine the types of business locations users visited after visiting the known business location. For instance, the distribution of user visits to other places can be determined within set time windows, such as 1, 4, 8, 16 and 24 hours. This distribution can be computed over categories of the business listing records (of business listing records 176) for each of the next visited known business locations, such as restaurant, grocery store, hotel, as opposed to a specific known business location that is visited The resulting data may reflect the fraction of people visiting that place category in a given time window after the subject location.

For example, with reference to FIG. 3, user U1 visited the geographic location 214, within 12 hours prior to visiting the subject geographic location 210. Geographic location 214 can be compared to the business listing records 176 and correlated to a known business location for a business titled "Main Street Lodging" having a category of "hotel." Furthermore, after visiting the subject geographic location 210, user U1 visited the geographic location 216, which may be compared to the business listing records 176 and correlated to a known business location for a business titled "Jenny's Shirt Shop" having a category of "retail."

In addition, user U2 visited geographic location 218 within twelve hours prior to arriving at the subject geographic location 210. Geographic location 218 may be compared to the business listing records 176 and correlated to a known business location for a business titled "First Bank" and having a category of "financial." Similarly, next location data shows that user U2 visited geographic location 220, within twelve hours after arriving at the subject geographic location 210. Geographic location 218 may be compared to the business listing records 176 and correlated to a known business location for a business titled "Science Museum" and having a category of "museum."

The user visiting patterns for Fast Break Breakfast at geographic location 210 shown, for example, in FIG. 3 indicate that the majority of users going to Fast Break Breakfast arrive between the hours of 7:30-11:00 a.m. and no users arrive after 12:30 p.m. Similarly, user visiting patterns may show that most users at the location do not stay at the restaurant longer than 30 minutes. Additionally, the locations visited before and after Fast Break Breakfast indicate sequential user visiting patterns. For example, many users commonly visited a hotel prior or financial institution prior to visiting Fast Break Breakfast. Similarly, users visited a retail location after visiting Fast Break Breakfast.

In addition to previous location data and the next visit data, other types of user visiting patterns may also be analyzed. For instance, co-visit data may capture user visiting patterns that reflect two or more known business locations that users typically visit together or overtime. Long term user location history can be used to establish similar types of places that are commonly visited together. For example, if a large portion of users visiting a restaurant at a first geographic location also frequently visit a restaurant at a second geographic location known to be a vegetarian restaurant, it can be inferred that the restaurant at the first geographic location is also likely to be a vegetarian restaurant.

An operator may use the location history data and user visiting patterns discussed above as a key to assign one or more of the pre-defined labels 174 to one or more of the known business locations. With reference back to FIG. 3, an operator may assign labels to Fast Break Breakfast at the geographic location 210, which identify attributes of the geographic location, based upon the user visitor patterns drawn from the location history data. For instance, as noted above, the location history data for Fast Break Breakfast shown in FIG. 4 reveals users arrive at Fast Break Breakfast between the hours of 7:30-11:00 a.m. and no users arrive after 12:30 p.m. Similarly, user visiting patterns may show that most users at the location do not stay at the restaurant longer than 30 minutes. The operator may therefor assign at least the following labels to Fast Break: breakfast, take out, low price, and food. The operator may also cross reference the operator-assigned labels with third-party ratings or reviews.

The operator-assigned labels, location history data, and specific locations may be used to train a classifier and create the model 172 of storage system 150. For instance, the model may be configured to identifies a confidence in or likelihood of a known business location having any of the attributes of the operator-assigned labels using user location history data that includes the known business location.

The user visiting patters discussed above can also be used to train the classifier. In this regard, these user visiting patterns can have positive and negative influences can be weighed to determine whether a geographic location receives a particular label. In the example of the geographic location 230 in FIG. 3, which corresponds to a known restaurant named French Dining, positive and negative influences can be considered to determine whether to label French Dining as "romantic." Positive influences (those that make the attribute more likely for a location, and the likelihood value of that attribute for the location greater) can include people visiting the restaurant on weekends, arriving at the restaurant between 8-10 pm, staying for more than 90 minutes, and coming to the restaurant from a luxury hotel, museum, or performing arts theater.

Negative influences (those that make the attribute less likely for a location, and the likelihood value of that attribute for the location lower) can include people visiting the restaurant on Mondays and Tuesdays, staying for a duration of less than 60 minutes, and arriving at the restaurant before or after visiting a grocery store or gas station.

Once the classifier has been trained to relate the location history data and user visiting patterns to specific ones of the pre-defined labels, the classifier can use other or new location history data including a particular known business location as input to the classifier. The classifier then uses the model to output likelihood values for the particular known business location having any of the attributes of any of the pre-defined labels 174. The result is a list of attributes and associated likelihood values. As an example, these likelihood values may be arranged on a predetermined scale, such as from 0 to 1, where 0 is not likely at all and 1 being very likely that a label which is applied to the geographic location is a correct description of the location. In other examples, the rating system may differ, such as the scale ranging from 1 to 10 or 1 to 100.

Identified attributes for a given known business location having a high enough likelihood value may be assigned to the given known business location. For instance, attributes that have likelihood values greater than a threshold value may be assigned to the given known business location or rather assigned to and stored in the business listing record of the known business location. This, in turn, may be provided to users who request information about the business at the known business location. As new user location data is received, it may be automatically input into the classifier to identify additional or new attributes for a given location. Alternatively, the location history data including a given location may be used as input into a classifier upon receiving a user request for more information about the given location.

For instance, if a business listing record of a known business location has a category of "restaurant", the occupancy data may be helpful to predict certain other attributes, such as when and whether the restaurant serves breakfast, lunch, and dinner. The restaurant may be more likely to serve breakfast, when the user location data indicates that large clusters of users occupy the restaurant between the hours of 7:00-11:00 A.M. and users do not occupy the restaurant at later times in the day. Such a restaurant would therefore have a high likelihood value for the label "breakfast," which would indicate that the restaurant serves breakfast. Similarly, the restaurant may serve lunch and dinner where the user location data indicates that the restaurant is occupied by large clusters of users between 12:00-3:00 P.M. and 5:00-9:00 P.M. Such a restaurant would also have a high likelihood value for the label "lunch" and "dinner," indicating that the restaurant serves lunch and dinner.

Some user visiting patterns may more accurately predict place attributes for certain locations than other. For instance, duration and occupancy data are good predictors for place attributes of restaurants. However, such data is less helpful to predict place attributes for other establishments, such as hotels. Instead, sequential visiting patterns, including locations visited prior to and subsequent to the subject location capture the types of places frequented by hotel guests. For example, to identify hotels with "beach access," positive influences may include user visits to surf shops, swimwear stores and beaches. Negative influences may include visits to water parks and ski resorts. In this instance, the user visiting patterns may show that on average, guests at hotels with beach access are ten times more likely to visit surf shops, swimwear stores, and beaches, and three times less likely to visits ski resorts, and two times less likely to visit department stores.

In addition to analyzing location history data and user visiting patterns to determine likelihood values, the classifier can be trained to assign likelihood values for the attributes of the labels using the interactions between the various attributes, which can further improve the accuracy of the attributes. For instance, a location that is "child friendly" may be less likely to be a restaurant that "serves alcohol". A place labeled as "romantic," however, is more likely to be a restaurant that "serves wine."

Figure 7:
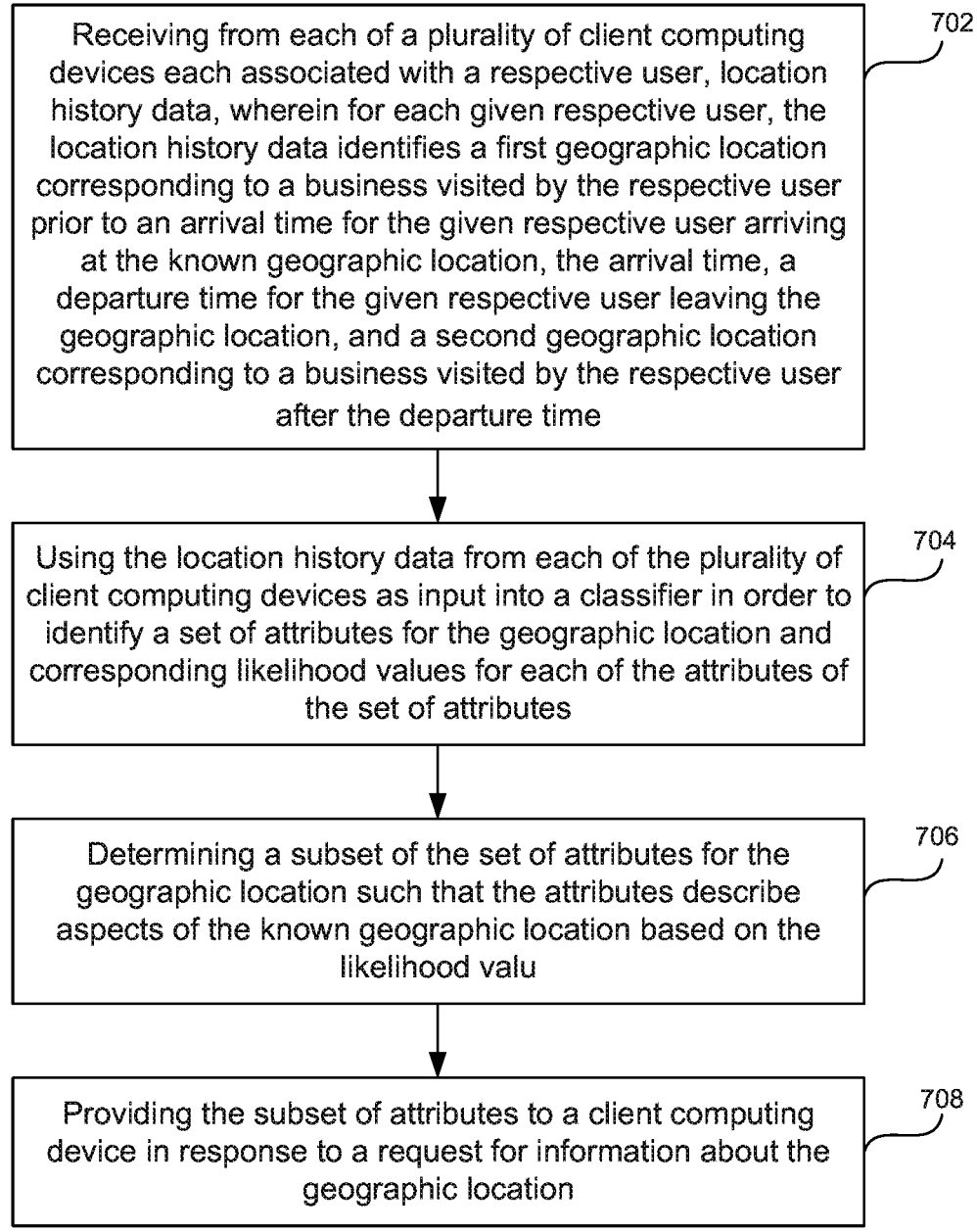
FIG. 7 is a flow diagram in accordance with aspects of the disclosure.

Flow diagram 700 of FIG. 7 is an example flow diagram of some of the aspects described above that may be performed by one or more computing devices such as client computing devices 110-140. In particular, flow diagram 700 illustrates a method of identifying attributes for a known geographic location for a business. At block 702, user location data is received from each of a plurality of client computing devices each associated with a respective user. The user location data for each given respective user, identifies a first geographic location corresponding to a business visited by the respective user prior to an arrival time for the given respective user arriving at the known geographic location, the arrival time, a departure time for the given respective user leaving the geographic location, and a second geographic location corresponding to a business visited by the respective user after the departure time. At block 704, the location history data from each of the plurality of client computing devices is used as input into a classifier in order to identify a set of attributes for the geographic location and corresponding likelihood values for each of the attributes of the set of attributes. At block 706, a subset of the set of attributes for the geographic location is determined such that the attributes describe aspects of the known geographic location based on the likelihood. At block 708, the subset of attributes is provided to a client computing device in response to receiving a request for information about the geographic location Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of predicting attributes, the method comprising:
constructing a classification model, the construction including:
assigning, for each entity in a collection of entities, labels identifying attributes associated with the entities,
training a classifier based on the assigned labels, a collection of location history data, and known locations for each entity in the collection of entities, the classifier being trained to identify a set of attributes for each entity and corresponding likelihood values for each attribute in the set of attributes, and
updating the classifier by further training the classifier to refine the likelihood values for each attribute in the set of attributes using interactions between the attributes in the set of attributes,
receiving, by the one or more processors, from each of a plurality of client computing devices each associated with a respective user, location history data collected by each of the plurality of client computing devices, wherein for each given respective user, the location history data identifies (i) an arrival time that the respective user arrived at a known geographic location of a particular entity, (ii) a first geographic location corresponding to another entity visited by the respective user prior to the arrival time the given respective user arrived at the known geographic location, (iii) a departure time that the given respective user left the known geographic location, and (iv) a second geographic location corresponding to a third entity visited by the respective user after the departure time;
identifying, by the one or more processors based on the location history data, user visiting patterns to geographic locations for respective entities;
inputting, by the one or more processors, the location history data from each of the plurality of client computing devices and the user visiting patterns into the classifier;
identifying, by the classifier, a set of attributes for the particular entity at the known geographic location and corresponding likelihood values for each attribute in the set of attributes for the known geographic location;
determining, by the one or more processors, a subset of the set of attributes for the particular entity at the known geographic location that describe predicted aspects of the particular entity based on whether the likelihood values exceed a threshold value; and
providing, by the one or more processors, the subset of the set of attributes for the particular entity to a client computing device in response to receiving a request for information about the particular entity.

2. The method of claim 1, wherein determining the subset of the set of attributes occurs in response to receiving the request for information.

3. The method of claim 1, wherein the location history data further includes duration data which provides a duration of time that a user spent at the known geographic location and the method further comprises using the duration data to identify the likelihood values for the set of attributes.

4. The method of claim 1, wherein identifying the set of attributes is based on co-visit data defining user visiting patterns for a pair of users that visit one or more known entity locations together.

5. The method of claim 1, further comprising:
accessing a set of entity listing records to identify the first geographic location and the second geographic location, wherein each of the first geographic location, the second geographic location, and the known geographic location corresponds to a respective entity listing record of the entity listing records; and
updating the respective entity listing record of the known geographic location to include the subset of attributes.

6. The method of claim 5, wherein identifying the set of attributes is further based on categories for the first geographic location, the second geographic location, and the known geographic location defined in the respective entity listing records the first geographic location, the second geographic location, and the known geographic locations.

7. The method of claim 1, further comprising:
accessing a set of pre-defined attributes for a category of entity corresponding to the category of the entity defined in a entity listing record for the entity, such that the set of attributes includes the set of pre-defined attributes; and
updating the entity listing record to include the subset of attributes.

8. A system for predicting attributes, the system comprising one or more processors configured to:
construct a classification model, the construction of the classification model including:
assigning, for each entity in a collection of entities, labels identifying attributes associated with the entity,
training a classifier based on the assigned labels, a collection of location history data, and known locations for each entity in the collection of entities, the classifier being trained to identify a set of attributes for each entity and corresponding likelihood values for each attributes in the set of attributes, and
updating the classifier by further training the classifier to refine the likelihood values for each attribute in the set of attributes using interactions between the attributes in the set of attributes,
receive from each of a plurality of client computing devices each associated with a respective user, location history data collected by each of the plurality of client computing devices, wherein for each given respective user, the location history data identifies (i) an arrival time that the respective user arrived at a known geographic location of a particular entity, (ii) a first geographic location corresponding to another entity visited by the respective user prior to the arrival time the given respective user arrived at the known geographic location, (iii) a departure time that the given respective user left the known geographic location, and (iv) a second geographic location corresponding to a third entity visited by the respective user after the departure time;
identify, by the one or more processors based on the location history data, user visiting patterns to geographic locations for respective entities;
input the location history data from each of the plurality of client computing devices and the user visiting patterns into the classifier;
identify, by the classifier, a set of attributes for the particular entity at the known geographic location and corresponding likelihood values for each attribute in the set of attributes for the known geographic location;
determine a subset of the set of attributes for the particular entity at the known geographic location that describe predicted aspects of the particular entity based on whether the likelihood values exceeds a threshold value; and
provide the subset of the set of attributes for the particular entity to a client computing device in response to receiving a request for information about the particular entity.

9. The system of claim 8, wherein the one or more processors are further configured to determine the subset of the set of attributes in response to receiving the request for information.

10. The system of claim 8, wherein the location history data further includes duration data which provides a duration of time that a user spent at the known geographic location and the wherein the one or more processors are further configured to use the duration data to identify the likelihood values for the set of attributes.

11. The system of claim 8, wherein the one or more processors are further configured to identify the set of attributes based on co-visit data defining user visiting patterns for a pair of users that visit one or more known entity locations together.

12. The system of claim 8, wherein the one or more processors are further configured to:
access a set of entity listing records to identify the first geographic location and the second geographic location, wherein each of the first geographic location, the second geographic location, and the known geographic location correspond to a respective entity listing record of the entity listing records; and
update the respective entity listing record of the known geographic location to include the subset of attributes.

13. The system of claim 12, wherein the one or more processors are further configured to identify the set of attributes further based on categories for the first geographic location, the second geographic location, and the known geographic location defined in the respective entity listing records the first geographic location, the second geographic location, and the known geographic locations.

14. A non-transitory computer-readable medium storing instructions, the instructions when executed by one or more processors, cause the one or more processors to perform a method for predicting attributes for a entity, the method comprising:
constructing a classification model, the construction including:
assigning, for each entity in a collection of entities, labels identifying attributes associated with the entity,
training a classifier based on the assigned labels, a collection of location history data, and known locations for each entity in the collection of entities, the classifier being trained to identify a set of attributes for each entity and corresponding likelihood values for each attributes in the set of attributes, and
updating the classifier by further training the classifier to refine the likelihood values for each attribute in the set of attributes using interactions between the attributes in the set of attributes,
receiving from each of a plurality of client computing devices each associated with a respective user, location history data collected by each of the plurality of client computing devices, wherein for each given respective user, the location history data identifies (i) an arrival time that the respective user arrived at a known geographic location of a particular entity, (ii) a first geographic location corresponding to another entity visited by the respective user prior to the arrival time the given respective user arrived at the known geographic location, the arrival time, (iii) a departure time that the given respective user left the known geographic location, and (iv) a second geographic location corresponding to a third entity visited by the respective user after the departure time;

identifying, by the one or more processors based on the location history data, user visiting patterns to geographic locations for respective entities;

inputting the location history data from each of the plurality of client computing devices and the user visiting patterns into the classifier;

identifying, by the classifier, a set of attributes for the particular entity at the known geographic location and corresponding likelihood values for each of attribute in the set of attributes for the known geographic location; and determining a subset of the set of attributes for the particular entity at the known geographic location that describe predicted aspects of the particular entity based on whether the likelihood values exceeds a threshold value; and providing the predicted aspects of the known geographic location to a client computing device in response to a request for information about the known geographic location for the entity.

15. The medium of claim 14, wherein the method further comprises:

accessing a set of entity listing records to identify the first geographic location and the second geographic location, wherein each of the first geographic location, the second geographic location, and the known geographic location correspond to a respective entity listing record of the entity listing records; and updating the respective entity listing record of the known geographic location to include the subset of the set of attributes.

* * * * *